(12) United States Patent
Keyser

(10) Patent No.: US 11,493,633 B2
(45) Date of Patent: Nov. 8, 2022

(54) RANGE-ENABLED THREE-DIMENSIONAL IMAGING SYSTEM AND ASSOCIATED METHODS

(71) Applicant: Government of the United States, as represented by the Secretary of the Air Force, Wright-Patterson AFB, OH (US)

(72) Inventor: Christian Keyser, Shalimar, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 938 days.

(21) Appl. No.: 16/267,638

(22) Filed: Feb. 5, 2019

(65) Prior Publication Data
US 2020/0249355 A1    Aug. 6, 2020

(51) Int. Cl.
| | |
|---|---|
| G01C 3/08 | (2006.01) |
| G01S 17/89 | (2020.01) |
| G01S 7/486 | (2020.01) |
| G01S 7/484 | (2006.01) |
| G01S 17/42 | (2006.01) |

(52) U.S. Cl.
CPC ............ *G01S 17/89* (2013.01); *G01S 7/484* (2013.01); *G01S 7/486* (2013.01); *G01S 17/42* (2013.01)

(58) Field of Classification Search
CPC . G01C 3/02; G01S 7/484; G01S 7/486; G01S 17/02; G01S 17/06; G01S 17/42; G01S 17/89; G01S 17/894; G01S 7/4815; G01S 17/46
See application file for complete search history.

(56) References Cited

U.S. PATENT DOCUMENTS

| | | | | |
|---|---|---|---|---|
| 4,051,371 A | * | 9/1977 | Dewey, Jr. ............. | G01J 3/433 |
| | | | | 250/339.09 |
| 5,418,361 A | * | 5/1995 | Pinnock ................. | G01D 5/268 |
| | | | | 250/227.21 |

(Continued)

FOREIGN PATENT DOCUMENTS

| | | | |
|---|---|---|---|
| DE | 102017207928 A1 | * | 11/2018 |
| EP | 3415949 A1 | * | 12/2018 ............. G01S 17/10 |

OTHER PUBLICATIONS

"Swinehart, D. F. , "The Beer-Lambert Law", Jul. 1962, Journal of Chemical Education, vol. 39 No. 7, p. 333-335" (Year: 1962).*

(Continued)

*Primary Examiner* — Samantha K Nickerson
(74) *Attorney, Agent, or Firm* — AFMCLO/JAZ; Larry L. Huston

(57) ABSTRACT

Systems and methods for three-dimensional (3-D) imaging enabled by natural range-dependent processes. Multiple lasers are configured to independently flash illuminate a target object to 3-D image a resultant "scene" onto a focal plane array (FPA). The first laser produces a wavelength non-resonant with an atmospheric absorption line along the illumination path. The second laser produces a wavelength resonant with the atmospheric absorption line, and closely spaced with the non-resonant wavelength. A ratio of the respective intensities recorded at the FPA for the two wavelengths calculates a range to the target object.

14 Claims, 9 Drawing Sheets

(56) References Cited

U.S. PATENT DOCUMENTS

| | | | | |
|---|---|---|---|---|
| 6,765,606 | B1* | 7/2004 | Iddan | G01S 7/4911 |
| | | | | 348/42 |
| 9,305,220 | B2 | 4/2016 | Funayama et al. | |
| 10,003,168 | B1* | 6/2018 | Villeneuve | G01S 7/497 |
| 10,222,475 | B2* | 3/2019 | Pacala | G01S 17/42 |
| 10,348,051 | B1* | 7/2019 | Shah | H01S 3/06783 |
| 2007/0215795 | A1* | 9/2007 | Kameyama | G01S 7/491 |
| | | | | 250/222.2 |
| 2010/0309288 | A1* | 12/2010 | Stettner | H04N 5/33 |
| | | | | 348/E13.001 |
| 2012/0150484 | A1* | 6/2012 | Odhner | H04B 10/00 |
| | | | | 356/614 |
| 2014/0085622 | A1* | 3/2014 | Wong | G01S 17/89 |
| | | | | 356/5.04 |
| 2014/0231647 | A1* | 8/2014 | Chinn | G01S 7/4818 |
| | | | | 250/353 |
| 2017/0011499 | A1* | 1/2017 | Reinhardt | G01S 17/18 |
| 2017/0089829 | A1* | 3/2017 | Bartholomew | G01S 17/86 |
| 2019/0196020 | A1* | 6/2019 | Aceti | G01S 17/87 |

OTHER PUBLICATIONS

"Hsieh, C., Wu, C., Jih, F., Sun, T., "Focal-Plane-Arrays and CMOS Readout Techniques of Infrared Imaging Systems", Aug. 1997, IEEE Transactions on Circuits and Systems for Video Technology, vol. 7, No. 4, p. 594-605" (Year: 1997).*

"Stettner, R., Bailey, H., Silverman, S., "Large format time-of-flight focal plane detector development", 2005, Proceedings of SPIE, vol. 5791, p. 288-292" (Year: 2005).*

"Stettner, R., "Compact 3D flash lidar video cameras and applications", 2010, Proceedings of SPIE, vol. 7684, p. 768405-1-768405-8" (Year: 2010).*

"Itzler, M., Entwistle, M., Owens, M., Jiang, X., "Geiger-mode avalanche photodiode focal plane arrays for three-dimensional imaging LADAR", Aug. 2010, Proceedings of SPIE, vol. 7808, p. 78080C-1-78080C-14" (Year: 2010).*

"Browell, E., "Differential Absorption Lidar Sensing of Ozone, Mar. 1989, Proceedings of the IEEE, vol. 77, No. 3, p. 419-432"" (Year: 1989).*

"Gardi, A., Sabatini, R., Wild, G., "Unmanned Aircraft Bistatic LIDAR for CO2 Column Density Determination", 2014" (Year: 2014).*

"Petrin, R., Nelson, D., Quagliano, J., Schmitt, M., Quick., C., Sander, R., Tiee, J., and Whitehead, M., "Atmospheric Effects on CO2 Differential Absorption Lidar Performance", 1996" (Year: 1996).*

* cited by examiner

RANGE-ENABLED THREE-DIMENSIONAL IMAGING SYSTEM AND ASSOCIATED METHODS

STATEMENT OF GOVERNMENT INTEREST

The invention described herein may be manufactured, used, and licensed by or for the Government of the United States for all governmental purposes without the payment of any royalty.

BACKGROUND

Laser Detection and Ranging (LADAR), a special category of Light Detection and Ranging (LIDAR or Lidar), is an optical sensing technology that determines distance, velocity, and/or other characteristics of a distant target object by illuminating the target object with pulsed laser light and analyzing the reflected pulses as detected by some number of sensors. Differences in pulsed laser return times and wavelengths may be used to create digital three-dimensional (3-D) representations of the target object.

LADAR technology has terrestrial, airborne, and mobile applications. For example, LADAR technology may be used to create high-resolution maps of the surfaces of distant objects, with applications in geodesy, geomatics, archaeology, geography, geology, geomorphology, seismology, forestry, atmospheric physics, laser guidance, airborne laser swath mapping (ALSM), and laser altimetry. Application of LADAR to enable 3-D imaging for control and navigation of autonomous vehicles is currently a focus of significant research.

As commonly employed in known LADAR solutions, measurement of a signal received by a detector, such as a focal plane array (FPA), may be calculated as follows:

$$S = f(R)A(R)Q(R)D\rho$$

where S denotes a measured signal, $f(R)$ denotes a function of range describing signal reduction due to scattering targets, $A(R)$ denotes atmospheric absorption, $Q(R)$ denotes a laser-target overlap integral, D denotes a detector collection aperture and includes the effect of system transmission and detector sensitivity, and $\rho$ denotes target reflectivity. By way of definition, absorption is the process by which incident radiant energy is retained by a substance. As referred to herein, that substance is the atmosphere. When the atmosphere absorbs energy, the result is an irreversible transformation of radiation into another form of energy. The FPA is an image sensing device consisting of an array (typically rectangular) of light-sensing pixels at the focal plane of a lens. FPAs are used most commonly for imaging purposes (e.g., taking pictures or video imagery), but may also be used for non-imaging purposes such as spectrometry, lidar, and wave-front sensing.

Range to target is commonly determined by measuring a time between laser emission from a system, and from system measurement of laser light scattered from a target. Time of flight measurements typically require high bandwidth detectors and supporting electronics to precisely measure the time at which a signal was received by the detector. High accuracy measurements also typically require short laser pulses. Unfortunately, such high precision electronics result in high-cost designs to achieve working LADAR solutions.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
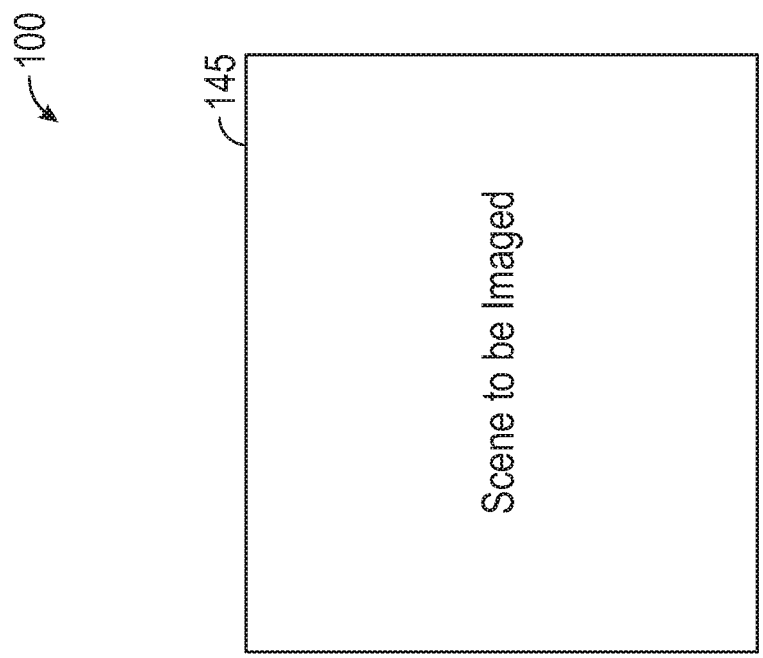
FIG. 1 is a schematic diagram of a differential atmospheric absorption analysis system, in accordance with embodiments of the disclosure.
Figure 1:
Figure 1:
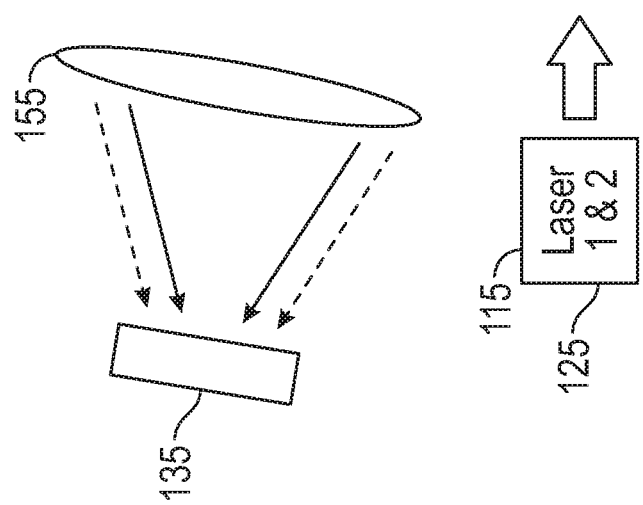

Specific embodiments of the disclosure will now be described in detail with reference to the accompanying figures. While this disclosure is susceptible of being embodied in many different forms, there is shown in the drawings and will herein be described in detail specific embodiments, with the understanding that the present disclosure is to be considered as an example of the principles of the described and not intended to limit the disclosure to the specific embodiments shown and described. In the description below, like reference numerals may be used to describe the same, similar or corresponding parts in the several views of the drawings.

The present disclosure relates generally to systems and associated methods of three-dimensional (3-D) imaging enabled by natural range-dependent processes. In certain embodiments, the present design enables the use of low-cost camera FPA instead of expensive high-speed detector arrays normally employed in conventional LADAR solutions. The technique may be advantageously employed and adapted in various solutions requiring 3-D imaging, such as machine vision for autonomous vehicles and potentially for gaming.

One embodiment of the present disclosure may advantageously exploit differential absorption in the atmosphere. The atmosphere comprises elements and compounds that may include, inter alia, oxygen ($O_2$), nitrogen ($N_2$), carbon monoxide (CO), carbon dioxide ($CO_2$), water ($H_2O$), and other atmospheric gas or gases. These elements and compounds may provide a laser transmission medium for the lasers described herein. The above-mentioned group of elements and compounds may be selected from for analysis.

Another embodiment of the present disclosure may exploit a differential in measured intensity from a scattering object. Embodiments may leverage the natural range-dependent processes associated with the transmission of a laser beam to a target and the resulting measured signal recorded at a sensor receiver. These embodiments may each comprise simple, low cost 3-D imaging architectures that may be advantageously employed together or separately.

Referring now to FIG. 1, one embodiment of a 3-D imaging system 100 that advantageously exploits differential absorption in the atmosphere is described in detail. For example, and without limitation, the system 100 may be composed of two lasers 115, 125, one focal plane array (FPA) 135, an imaging lens 155, a scene to be imaged (also referred to herein as a target) 145, and scattered light rays 146.

The FPA 135 need not be high bandwidth but instead may be a relatively low-bandwidth detector (e.g., low-bandwidth detector frame rates, such as those of a camera, may suffice). Bandwidth describes the width of a wavelength range with regard to a specific part of the spectrum which transmits incident energy via a filter. Bandwidth may be used to determine the resolution of spectrometers, spectral width of optical communication sources and duration of pulse waveforms. With respect to LADAR detectors, bandwidth typically refers to the frequency content of signals that such a detector is capable of faithfully reproducing. For example, given an optical signal characterized by a sinusoidal variation in time, the detector must have a bandwidth greater than the sine frequency in order to reproduce that sine wave. The higher the bandwidth, the greater the temporal or range resolution a LADAR system may have. In this example, a low bandwidth FPA means that the FPA pixels cannot faithfully reproduce the time variation of the incident optical signal. Instead, such a low bandwidth FPA sums all the incident energy and loses most of the temporal information. The temporal resolution of the FPA is ultimately limited by the frame rate which is typically tens to hundreds of frames per second. In certain embodiments of the present design, the relatively low-bandwidth is typically below 35 megabytes per second.

The lasers 115, 125 may be positioned substantially equidistant from a target object of interest 145 (also referred to herein as a scene) and configured to emit two very closely spaced wavelengths, such that one wavelength is resonant with an atmospheric absorption line defined between the lasers 115, 125 and the scene 145 and such that the other wavelength is just off the absorption line so that this latter wavelength does not suffer absorption. More specifically, the two wavelengths produced by the cooperating lasers 115, 125 may be considered "closely spaced" in that the two wavelengths are far apart enough such that their respective atmospheric transmissions are quite different but also such that their target reflectivities are quite similar.

By way of definition, atmospheric transmission describes how radiation propagates through an atmosphere, such as the earth's atmosphere. Bands, or ranges, of transmission or propagation (atmospheric transmission bands) are used to describe the radiation reflective and absorption properties. The atmospheric transmission band describes the capacity of the atmosphere to transmit electromagnetic energy. In the case of the earth's atmosphere, this atmospheric transmittance is dependent on the air mass penetrated by rays, as well as on the amount of water vapor and dust in the air. A high atmospheric transmission band has a higher rate of transmittance than a low atmospheric transmission band. The term high and low in this instance are relative to one another such that a relatively low atmospheric transmission band is less than a relatively high atmospheric transmission band.

In certain embodiments, the 3-D imaging system 100 of the present design may receive and use a first wavelength $\lambda_a$ that is in a relatively low atmospheric transmission band and a second wavelength $\lambda_b$ that is in a relatively high atmospheric transmission band. In other embodiments, the 3-D imaging system 100 of the present design may receive and use a first wavelength $\lambda_a$ that is in a relatively high atmospheric transmission band and a second wavelength $\lambda_b$ that is in a relatively low atmospheric transmission band.

The terms "relatively high . . . " and "relatively low . . . " mean that the higher value exceeds the lower value. Because these are relative terms, no specific values impact this disclosure. However, because these quantities are relative to each other, it is an embodiment of the present design that the first wavelength $\lambda_a$ and the second wavelength $\lambda_b$ may differ by approximately less than 0.015 micrometer (µm), while a respective reflectivity of the first wavelength $\lambda_a$ and of the second wavelength $\lambda_b$ may be approximately similar.

Indeed, the first wavelength $\lambda_a$ and the second wavelength $\lambda_b$ are of a relatively short laser pulse type. This short laser pulse may be characterized by a pulse width (also referred to as pulse duration) that is less than 100 ms and typically less than 10 ms. In certain embodiments of the present design, for example, and without limitation, relevant laser pulse widths may be less than 10 ms while round trip laser transit times (e.g., from sensor to target and back to sensor) may depend on range to target and approach ~6.7 ns/m.

For example, and without limitation, the first laser 115 may emit the non-resonant wavelength to flash illuminate the scene, or target, 145 such that the scene, or target, 145 may be imaged onto the FPA 135. The second laser 125 may emit the resonant wavelength to similarly flash illuminate the scene, or target, 145 such that the scene, or target, 145 may be imaged by the FPA 135. For the first laser 115, a first recorded intensity on each pixel of the FPA 135 may be a function of range to target and target reflectivity. For the second laser 125, a second recorded intensity may be a function of range, target reflectivity, and atmospheric absorption (which is also a function of range).

The ratio of the first and second recorded intensities is a function of the atmospheric absorption and, therefore, range. Knowing the atmospheric absorption at the two laser wavelengths, the system 100 may estimate the range to target from the ratio of the two measured intensities.

The ratio of two intensities the first intensity $S_a$ and the second intensity $S_b$ is defined as follows:

$$\frac{Sa}{Sb} = e^{-2R(\alpha(\lambda a) - \alpha(\lambda b))};$$

where α denotes an atmospheric absorption and scattering attenuation factor for the absorption line, and where R denotes the range.

The above equation is useful to measure, using the focal plane array, a first intensity $S_a$, of the first backscatter signal and a second intensity $S_b$ of the second backscatter signal and determining, using the focal plane array, a range to the target from a ratio of the first intensity $S_a$, and the second intensity $S_b$.

Continuing to refer to FIG. 1, a range-to-target determination method may comprise analysis of round-trip atmospheric absorption as follows: $A(R)=e^{-\alpha*2*R}$ where R denotes range to target and a denotes the atmospheric absorption and scattering attenuation factor. For example, and without limitation, $S1_i$ may represent a first signal measured at pixel i when the scene 145 is illuminated by the first laser 115 which has a wavelength non-resonant with an atmospheric absorption line. Also, $S2_i$ may represent a second signal measured at pixel i when the scene 145 is illuminated by the second laser 125 which has a wavelength resonant with the atmospheric absorption line.

Absorption is the process by which incident radiant energy is retained by a substance. In this case, the substance is the atmosphere. When the atmosphere absorbs energy, the result is an irreversible transformation of radiation into another form of energy.

The ratio of $S1_i/S2_i$ is given by $$\eta = \frac{S1_i}{S2_i} = e^{-2R(\alpha(\lambda 1)-\alpha(\lambda 2))}.$$

By measuring this ratio with a standard FPA 135 and knowing α at each wavelength, the system 100 may estimate, or determine, the R resolution dependence on η (e.g., the signal ratio) in the following:

$$\frac{d\eta}{dR} = -2(\alpha(\lambda 1) - \alpha(\lambda 2))e^{-2R(\alpha(\lambda 1)-\alpha(\lambda 2))}$$

More specifically, the ratio above allows simplification, leaving a simple expression dependent on α and R (i.e., because the wavelengths are so close, the ratio cancels out the reflectivity dependence). The system 100 may determine α (λ1) and a (λ2) based on meteorological conditions, and then calculate the range R.

Figure 2:
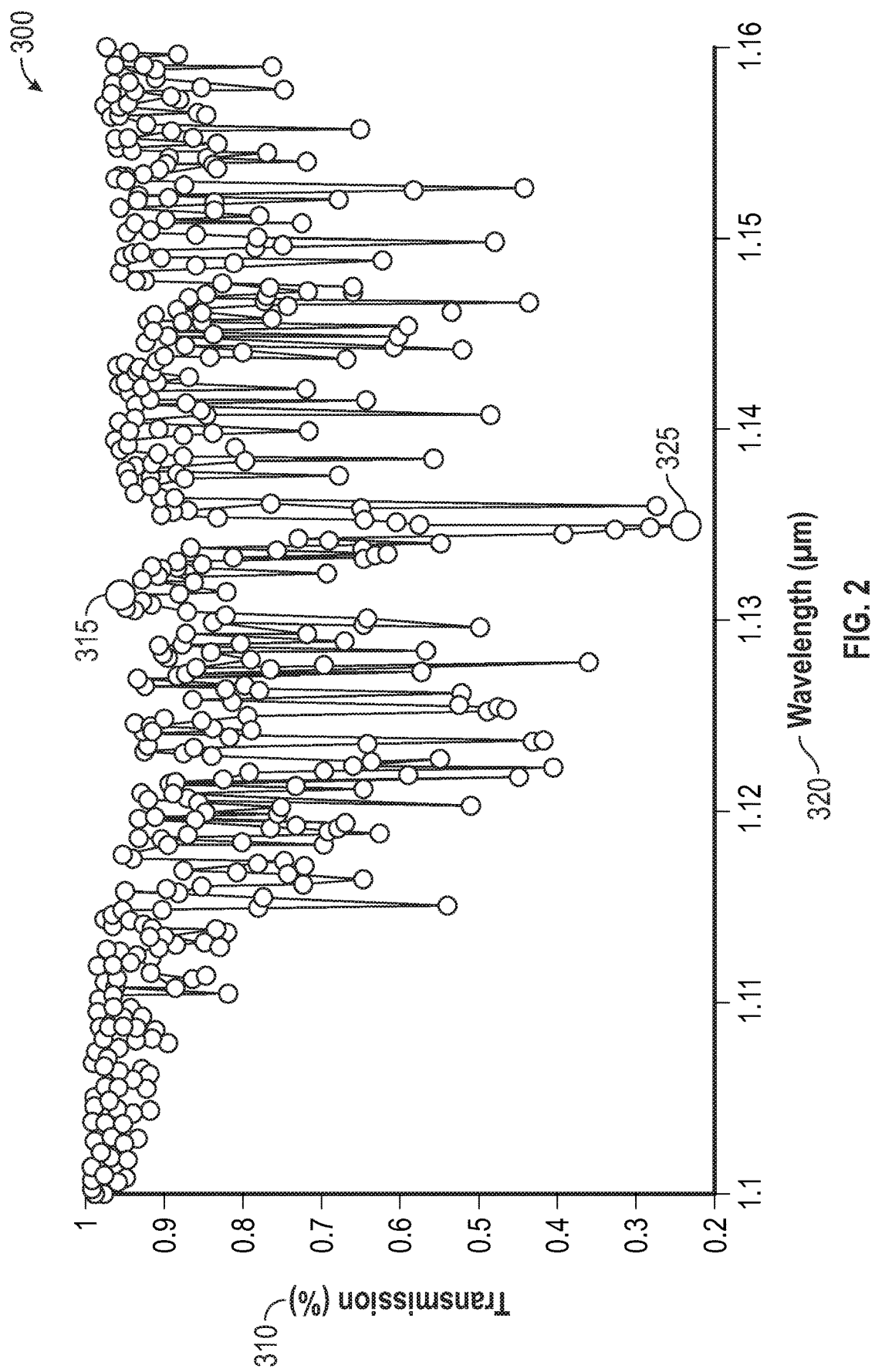
FIG. 2 is a graph of exemplary wavelengths employed to analyze differential absorption for an $H_2O$ (water) absorption line, in accordance with embodiments of the disclosure.

Referring now to FIG. 2, the chart 300 illustrates a portion of the non-infrared (NIR) atmospheric window transmission for an $H_2O$ absorption line. As shown in chart 300, more specifically, the sharp dip in transmission at a wavelength of approximately 1.135 μm corresponds to a water absorption line. The highlighted upper dot 315 indicates a first wavelength along a range of wavelengths 320 that is not resonant with the atmospheric absorption line (i.e., characterized by a high transmission percentage 310). The highlighted lower dot 325 shows a second wavelength along the range of wavelengths 320 that is resonant with the $H_2O$ absorption line (i.e., characterized by a low transmission percentage 310).

Operating the present design using an $H_2O$ absorption line may lead to complications as absorption may vary with humidity. A humidity measurement device and/or real-time National Oceanic and Atmospheric Administration (NOAA) meteorological humidity data may be employed to remove this variation. Alternatively, operating the present design using a more stable gas absorption line (e.g., oxygen ($O_2$), nitrogen ($N_2$), carbon monoxide (CO), carbon dioxide ($CO_2$)) may alleviate the complication of absorption variability.

Figure 3A:
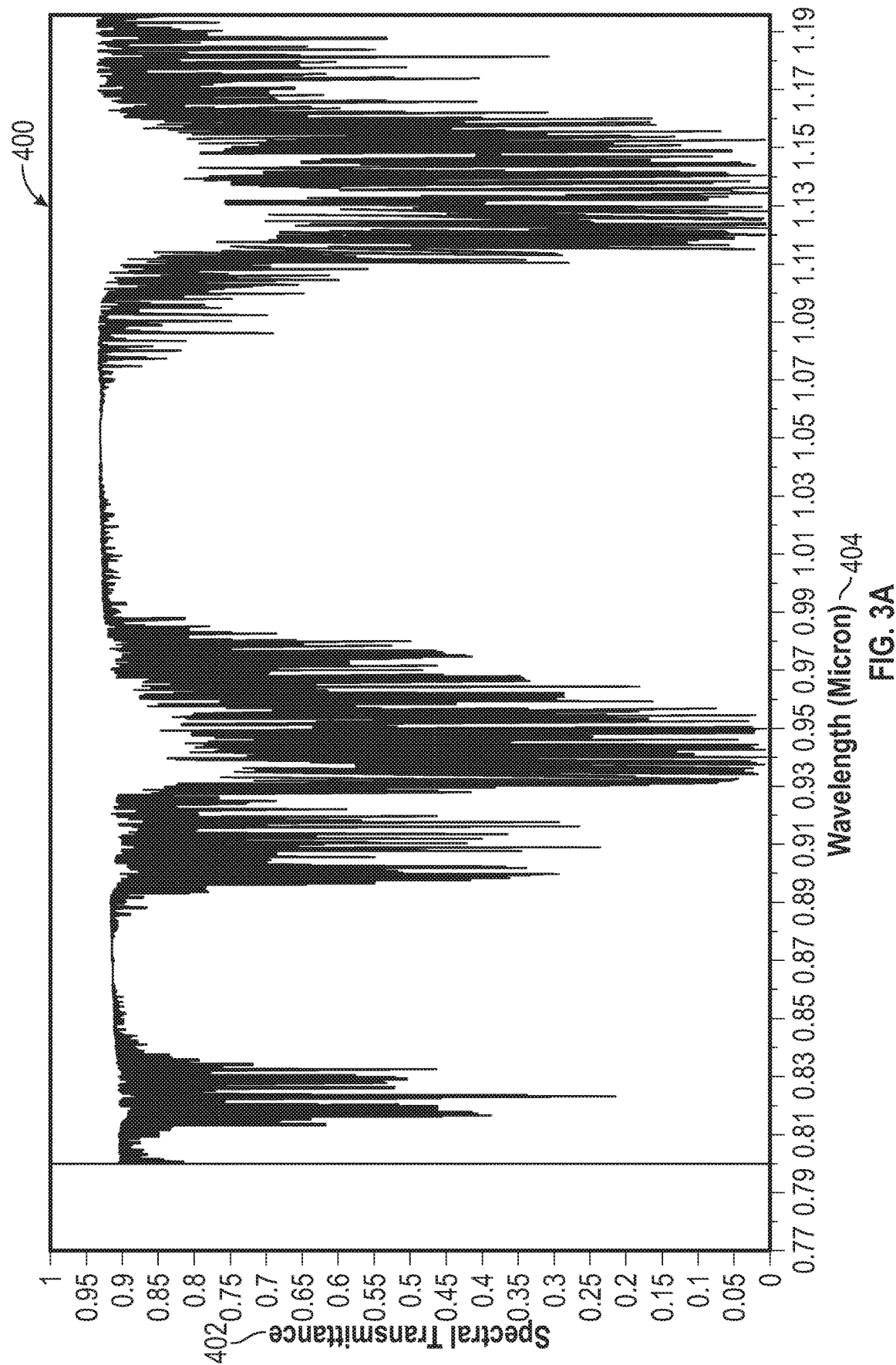
FIG. 3A is a graph of exemplary differential absorption for a 950 nm $H_2O$ absorption line.
Figure 3B:
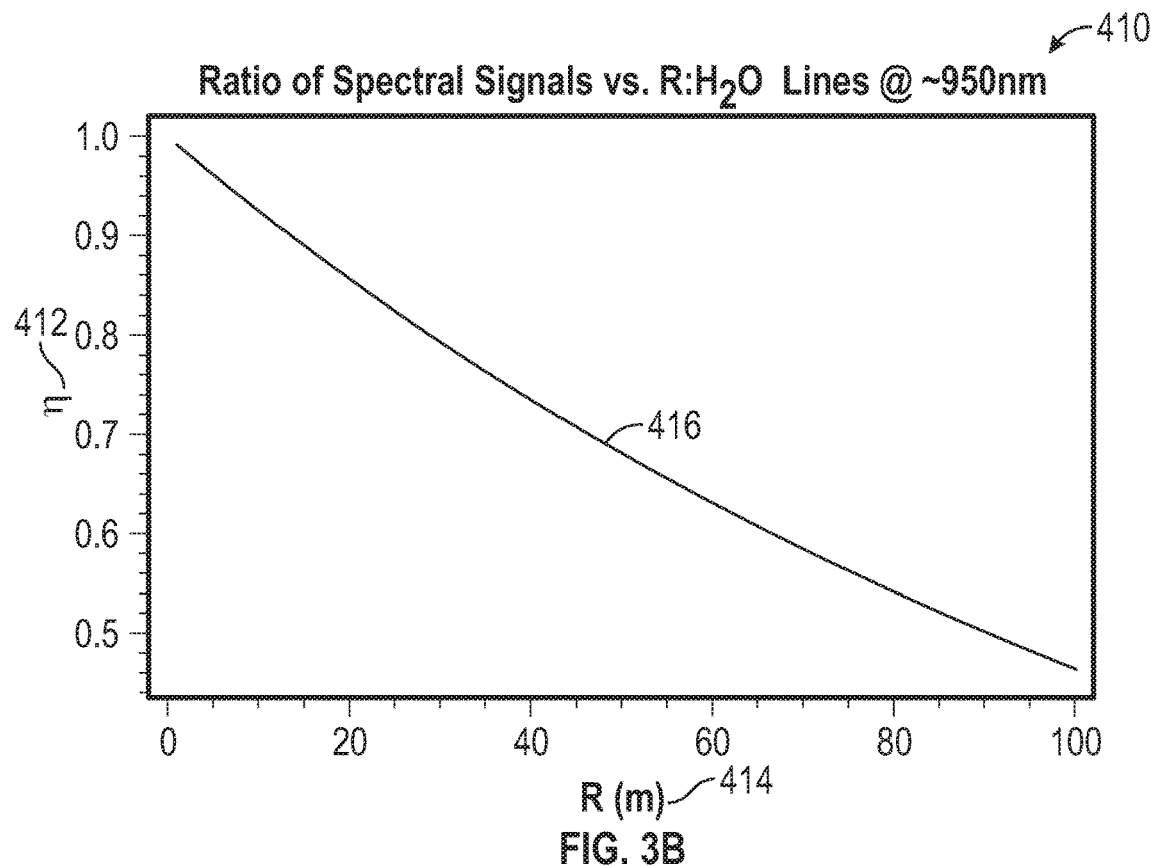
FIG. 3B is a graph of exemplary spectral signal ratios as a function of range for a 950 nm $H_2O$ absorption line.

For example, and without limitation, the present design may operate along a 950 nanometer (nm) $H_2O$ absorption line. Graph 400 at FIG. 3A illustrates spectral transmittance 402 as a function of wavelength 404. Similar to the phenomenon shown in chart 300 of FIG. 2, the water absorption line of FIG. 3A appears as a sharp dip in transmission at a wavelength of approximately 950 nm. Graph 410 at FIG. 3B illustrates a ratio of spectral signals 412 emitted from two lasers as a function of range R 414, as shown by line 416.

Figure 3C:
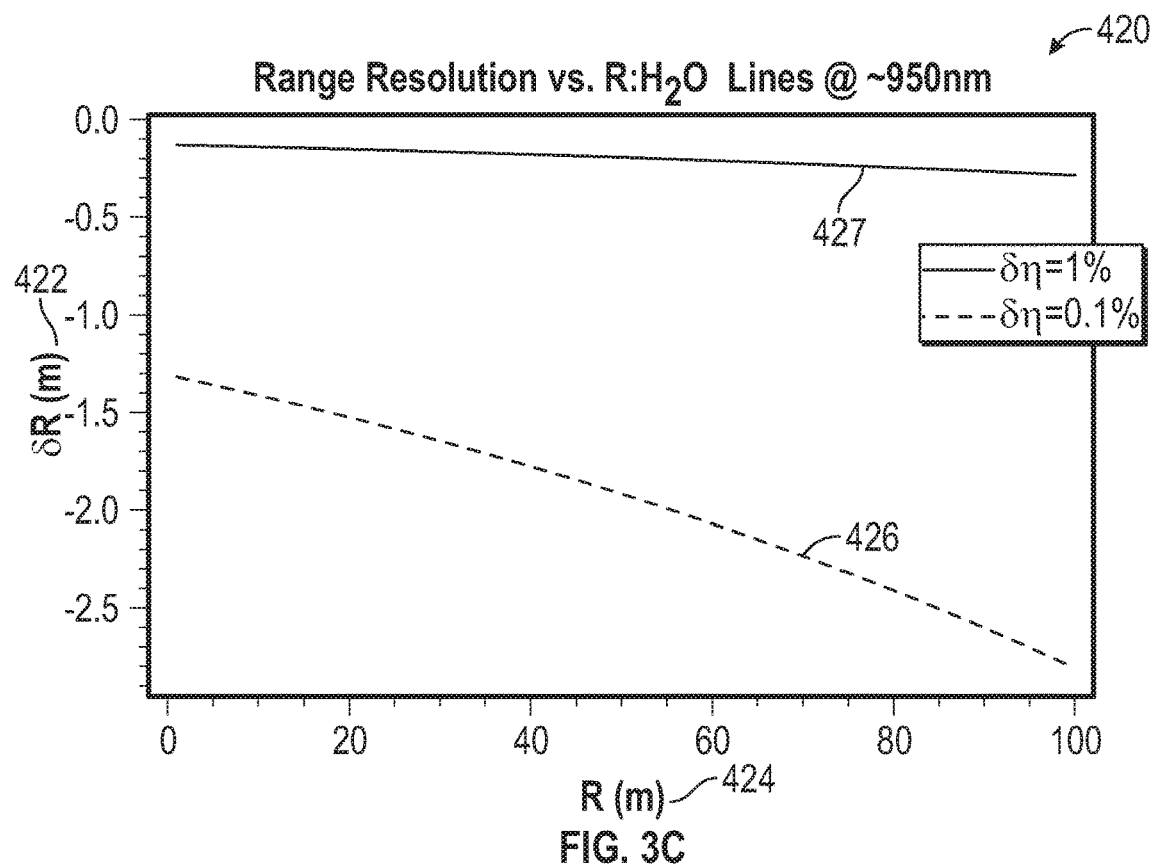
FIG. 3C is a graph of exemplary range resolution as a function of range for a 950 nm $H_2O$ absorption line.

Graph 420 at FIG. 3C illustrates, as shown by lines 426 and 427, the range resolution 422 inherent to an $H_2O$ absorption line, which manifests as the dramatic divergence, as a function of range R 424, of the plotted lines due to atmospheric absorption and scattering attenuation. Line 426 shows δη of 0.1% and line 427 shows δη of 1.0%, which represent two cases where the minimum ratio that may be measured is 0.1% and 1% (illustrating how the R resolution depends on the ability of a relatively low-bandwidth detector to measure small differences in signal intensity).

Figure 4A:
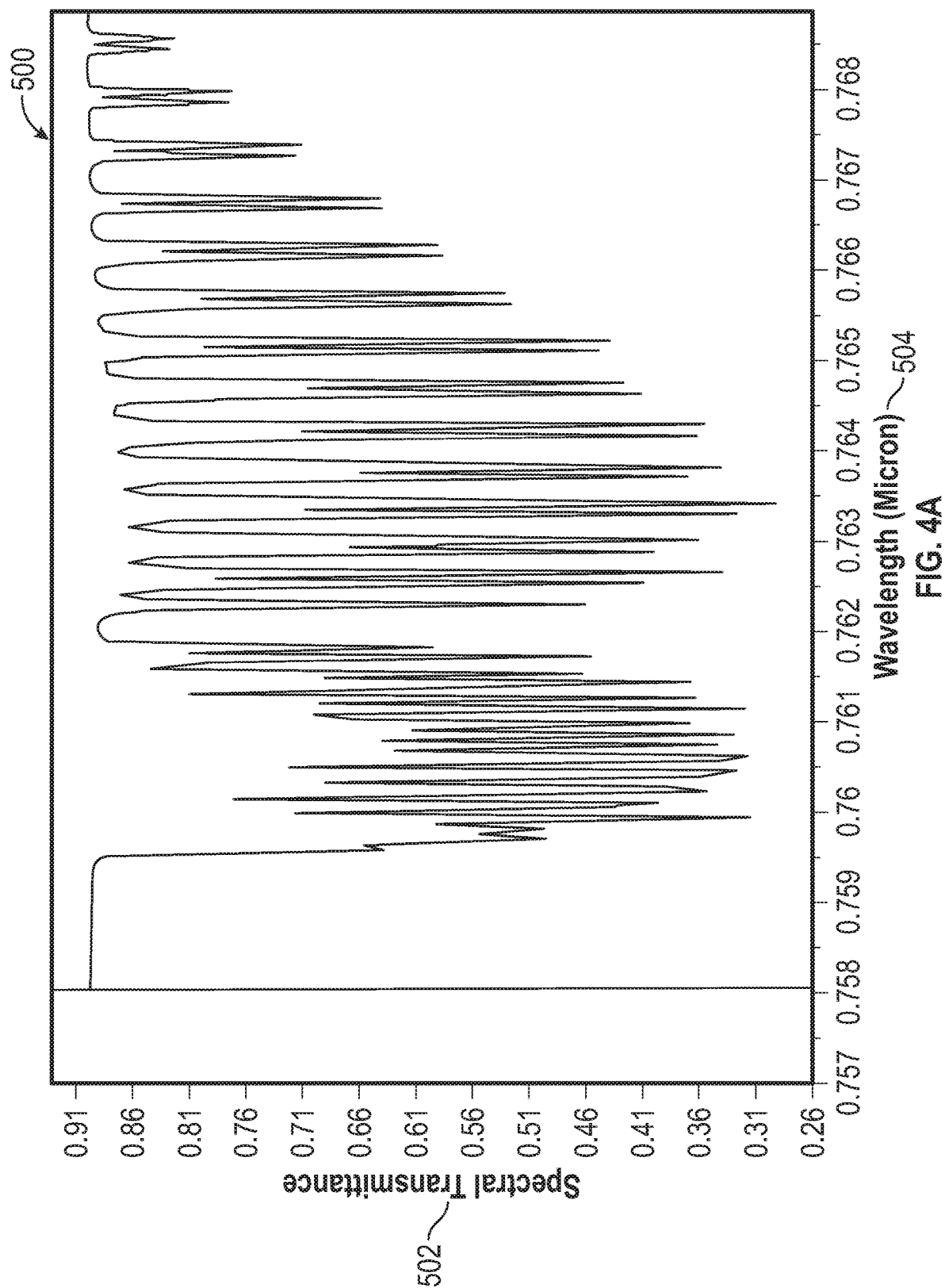
FIG. 4A is a graph of exemplary differential absorption for a 763 nm $O_2$ absorption line.

Also for example, and without limitation, consider the present design operating along a 763 nanometer (nm) $O_2$ absorption line. Graph 500 at FIG. 4A illustrates spectral transmittance 502 as a function of wavelength 504. Similar to the phenomenon shown in chart 300 of FIG. 2, the water absorption line of FIG. 4A appears as a sharp dip in transmission at a wavelength of approximately 763 nm.

Figure 4B:
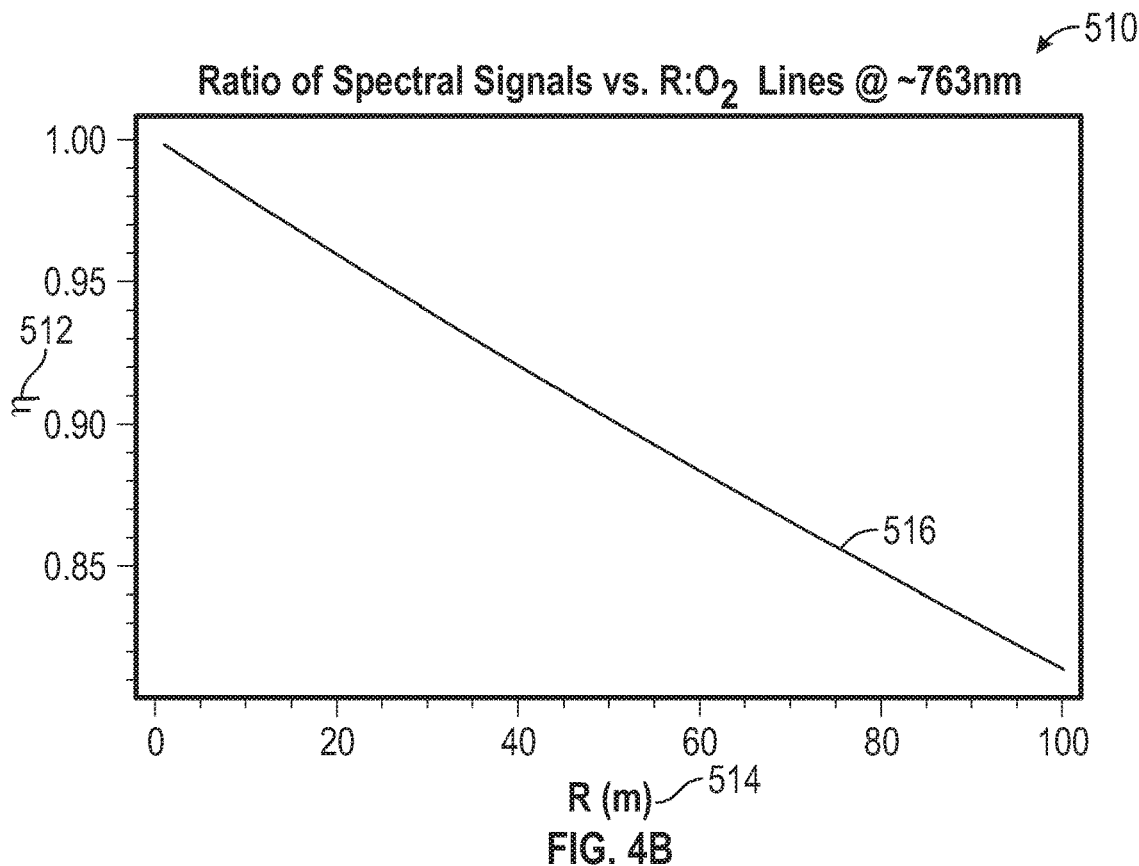
FIG. 4B is a graph of exemplary spectral signal ratios as a function of range for a 763 nm $O_2$ absorption line.

Graph 510 at FIG. 4B illustrates a ratio of spectral signals 512 emitted from two lasers as a function of range R 514, as shown by line 516.

Figure 4C:
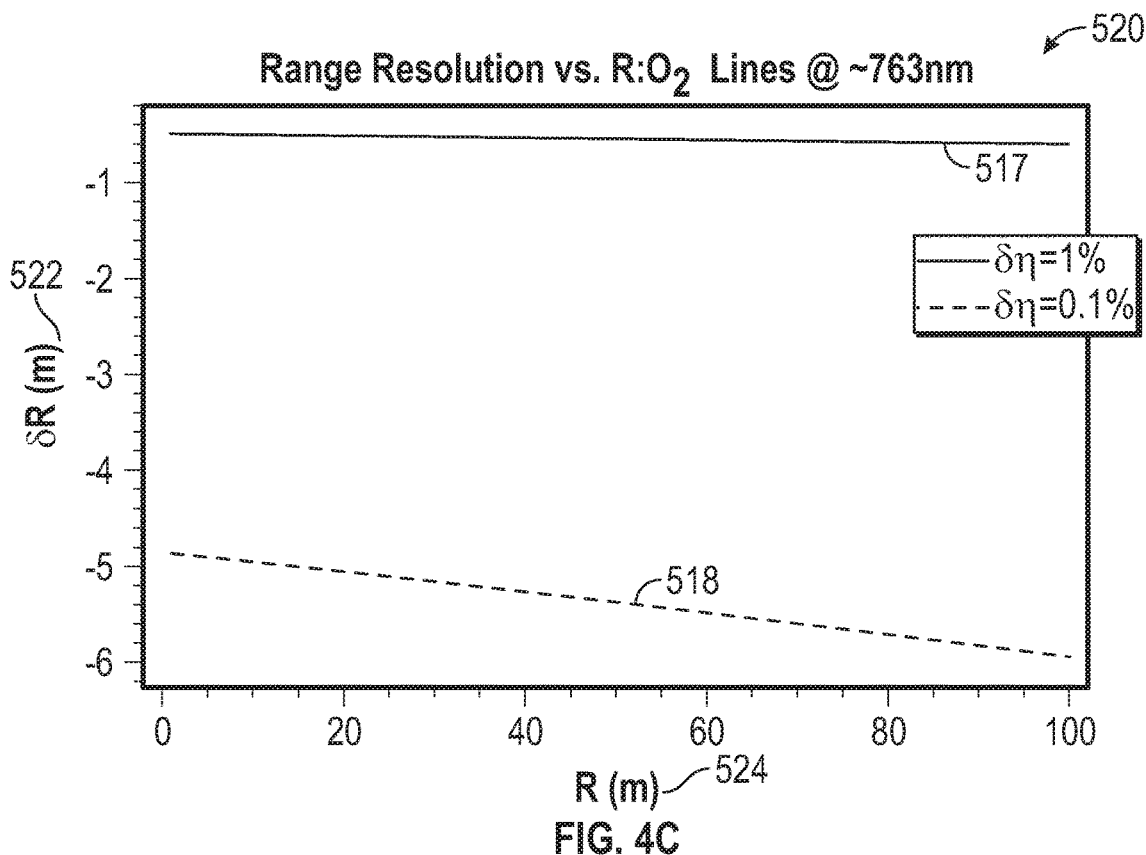
FIG. 4C is a graph of exemplary range resolution as a function of range for a 763 nm $O_2$ absorption line.

Graph 520 at FIG. 4C illustrates the range resolution 522 inherent to an $O_2$ absorption line, which does not suffer as dramatic a divergence, as a function of range R 524, of the plotted lines 517 and 518 due to atmospheric absorption and scattering attenuation as did the $H_2O$ absorption line. More specifically, in the two cases shown 517, 518, the minimum ratio that may be measured remains a relatively constant 1% and between 5% and 6%.

Figure 5:
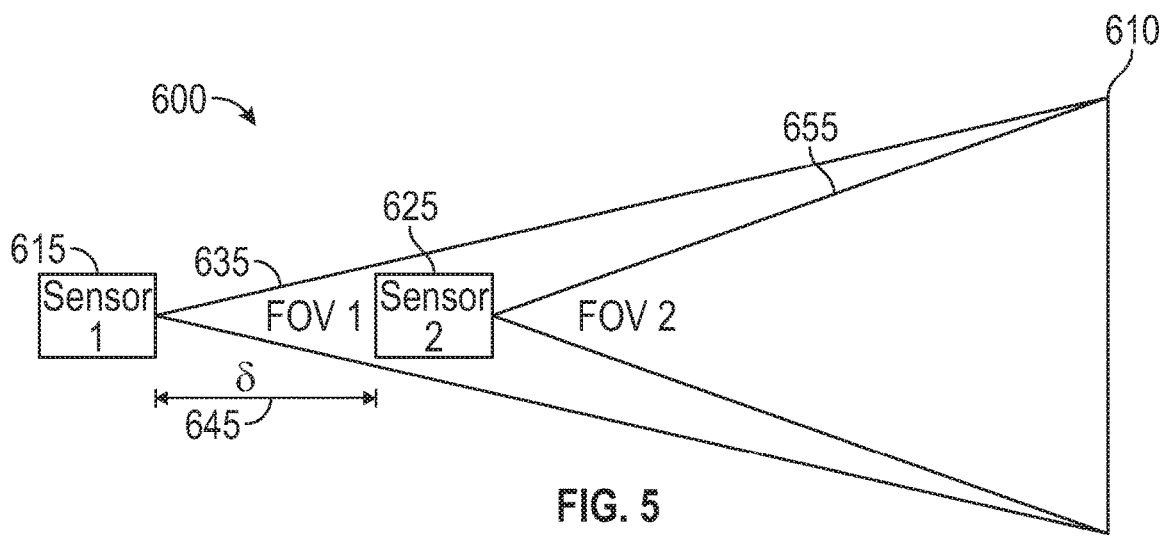
FIG. 5 is a schematic diagram of a target scattered signal variation analysis system, in accordance with embodiments of the disclosure.

Referring now to FIG. 5, a 3-D imaging system 600 that advantageously exploits target scattered signal variation with range will now be discussed in detail. For example, and without limitation, the system 600 may be composed of a single laser, or alternative light source, such as solar illumination, or a single solar illuminator, and two sensors 615, 625. Sensor 1 615 has an associated field of view (FOV1) 635. Sensor 2 625 has an associated field of view (FOV2) 655. Targets may be specular or non-specular.

Specular targets typically exhibit specular reflection, also known as regular reflection, which is the mirror-like reflection of waves, such as light, from a surface. The law of reflection states that for each incident ray the angle of incidence equals the angle of reflection, and the incident, normal, and reflected directions are coplanar. In contrast, a non-specular target exhibits non-specular wave reflection of light or sound from rough surfaces, resulting in scattering of wave components. Non-specular reflection is also known as diffuse reflection.

When a non-specular target 610 is illuminated by the light source, such as illuminator or solar illuminator, the incident light is scattered into a hemisphere and the signal has a change rate that changes with range according to the function $f(R)=R^{-2}$. Measurement of the scattered signal at two or more ranges may be used to estimate range and may also be used to estimate change rate. In the event the laser beam does not fully resolve, or overlap, the object the range dependent signal function will be $f(R)=R^{-4}$.

As illustrated in FIG. 5, the first active sensor 615 and the second active sensor 625 may be positioned such that these sensors 615, 625 image the same field of view, as shown by the overlap of FOV1 635 and FOV2 655, but are displaced from each other a distance 645, denoted as δ. Using sensors so deployed, a range-to-target determination method may comprise analysis of a signal measured at each pixel as follows:

$$S_{j,i} = f(R)A(R)Q(R)D\rho$$

where j=1, 2 depending on the sensor referenced, and where i is the pixel.

Using a common wavelength in each sensor 615, 625, the ratio of measured intensity for a point in the scene $S_{1,i}$, $S_{2,i}$, may be determined as $$\frac{S_{1,i}}{S_{2,i}} = \frac{f(R+\delta)}{f(R)} = \frac{(R+\delta)^2}{R^2}.$$

The ratio of measured intensities $S_{1,i}$, $S_{2,i}$, may be used to estimate range for each pixel in the scene.

In an alternative embodiment, the present design may substitute for the two sensors 615, 625 a single sensor that is moving. The single sensor may image a target scene from two positions along its vector (the displacement between these two positions serving as the distance 3 in the formulae above) and then may determine R as described above.

Figure 6A:
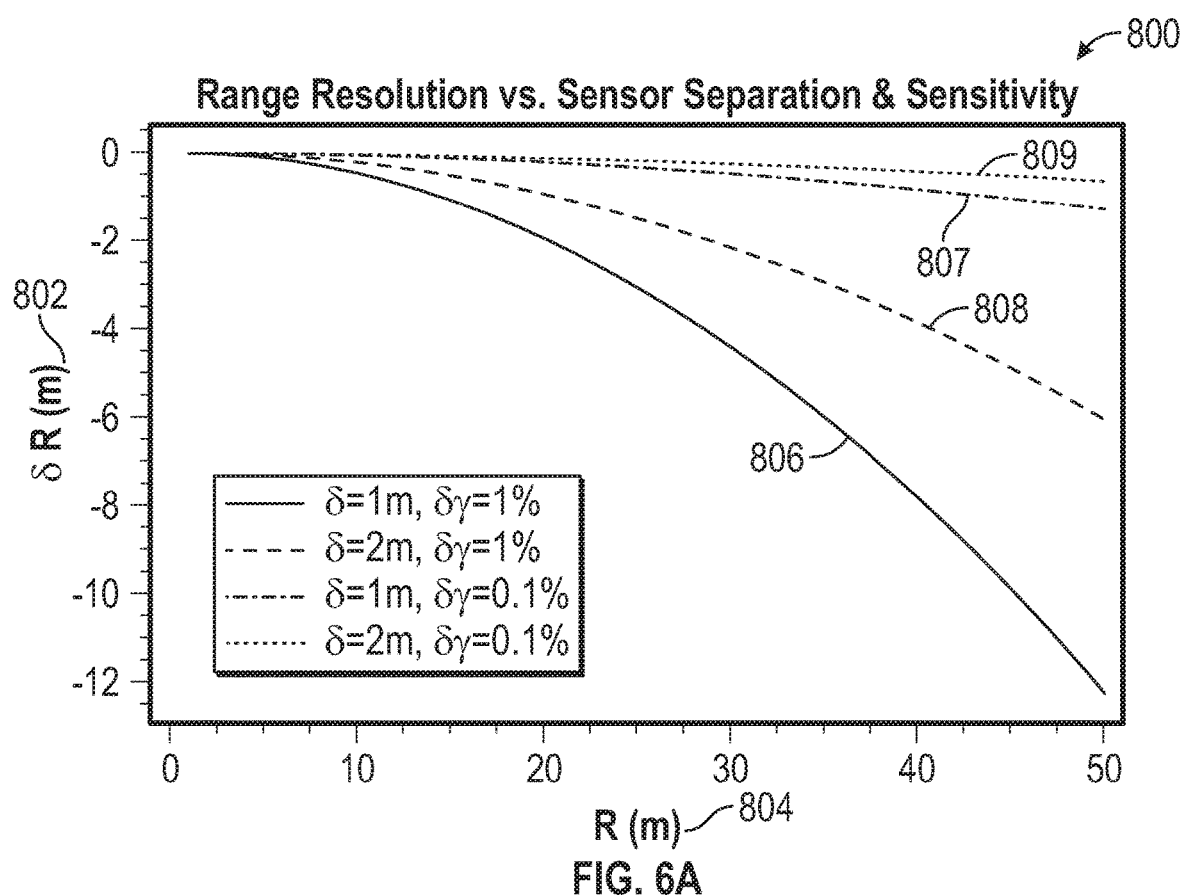
FIG. 6A is a graph of exemplary sensor separation/sensitivity as a function of range resolution.
Figure 6B:
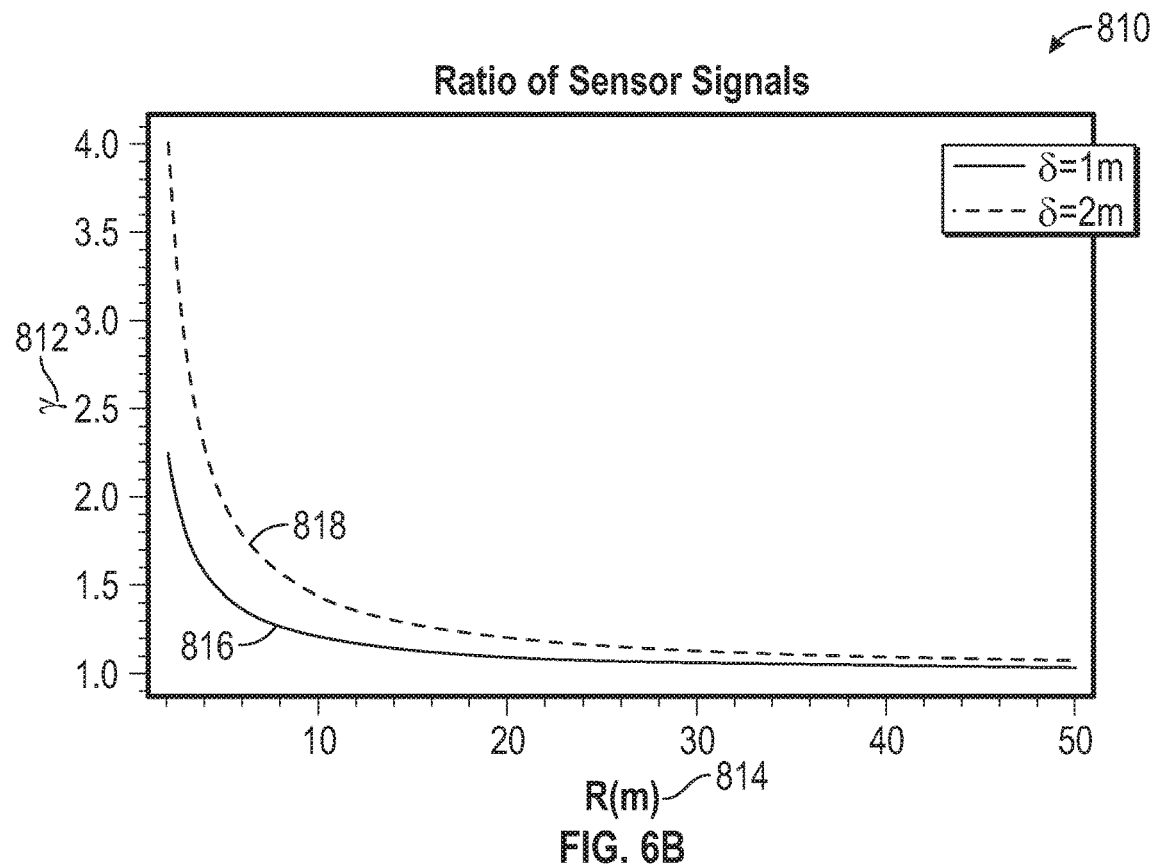
FIG. 6B is a graph of exemplary sensor signal ratios as a function of range.
Figure 6C:
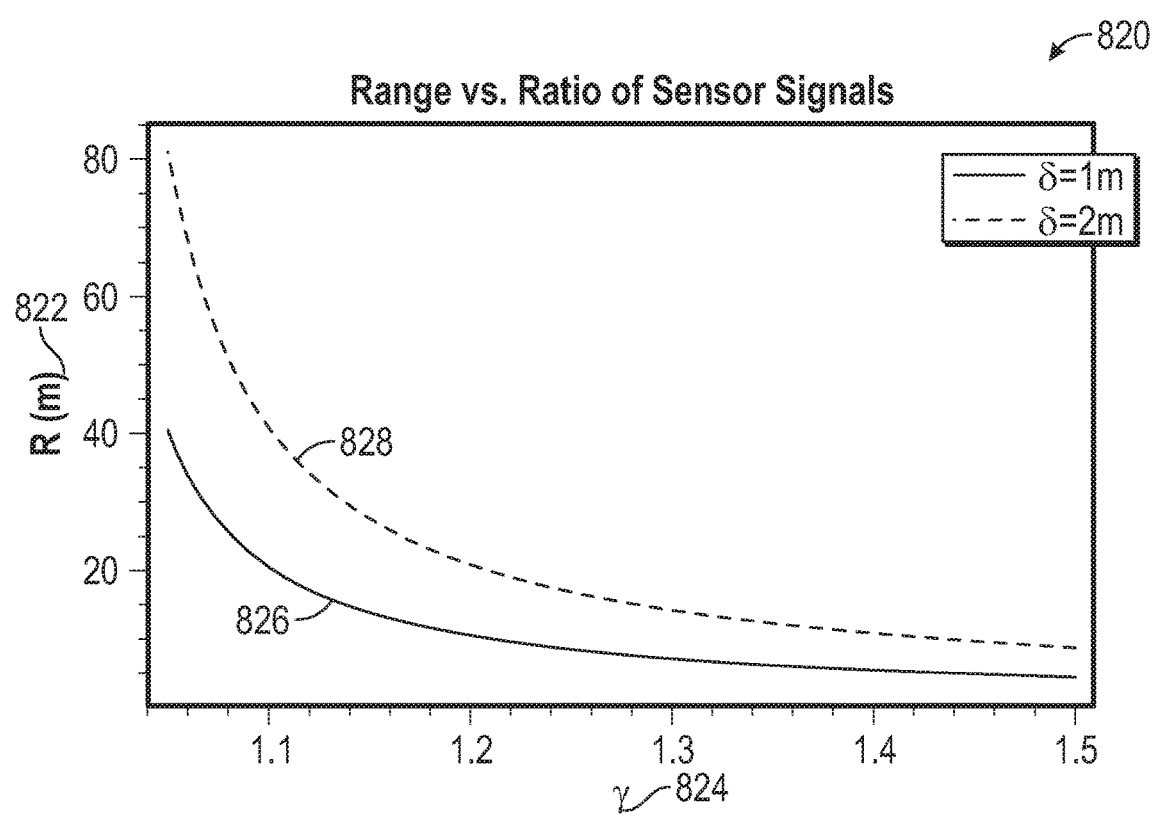
FIG. 6C is a graph of exemplary range dependence on ratio gamma.

For example, and without limitation, consider the present design operating as shown in FIGS. 6A-6C.

Graph 800 at FIG. 6A illustrates resolution 802 as a function of range 804 for sensor separations of 1 meter and 2 meter, and for detector sensitivity enabling ratios as small as 1% and 0.1%. Line 806 shows δ equal to 1 meter and δγ equal to 1%. Line 808 shows δ equal to 2 meters and δγ equal to 1%. Line 807 shows δ equal to 1 meter and δγ equal to 0.1%. Line 809 shows δ equal to 2 meters and δγ equal to 0.1%.

Graph 810 at FIG. 6B illustrates a ratio of sensor signals 812 received as backscatter from a field of view (FOV) as a function of range R 814. Backscatter is the reflection of waves, particles, or signals back to the direction from which they came. It is a diffuse reflection due to scattering, as opposed to specular reflection as from a mirror. Line 816 shows δ equals 1 meter and line 818 shows δ equals 2 meters.

Graph 820 at FIG. 6C illustrates range (R(m)) 822 determined as a function of the ratio of sensor signals (γ) 824. Line 826 shows δ equals 1 meter and line 828 shows δ equals 2 meters.

Figure 7:
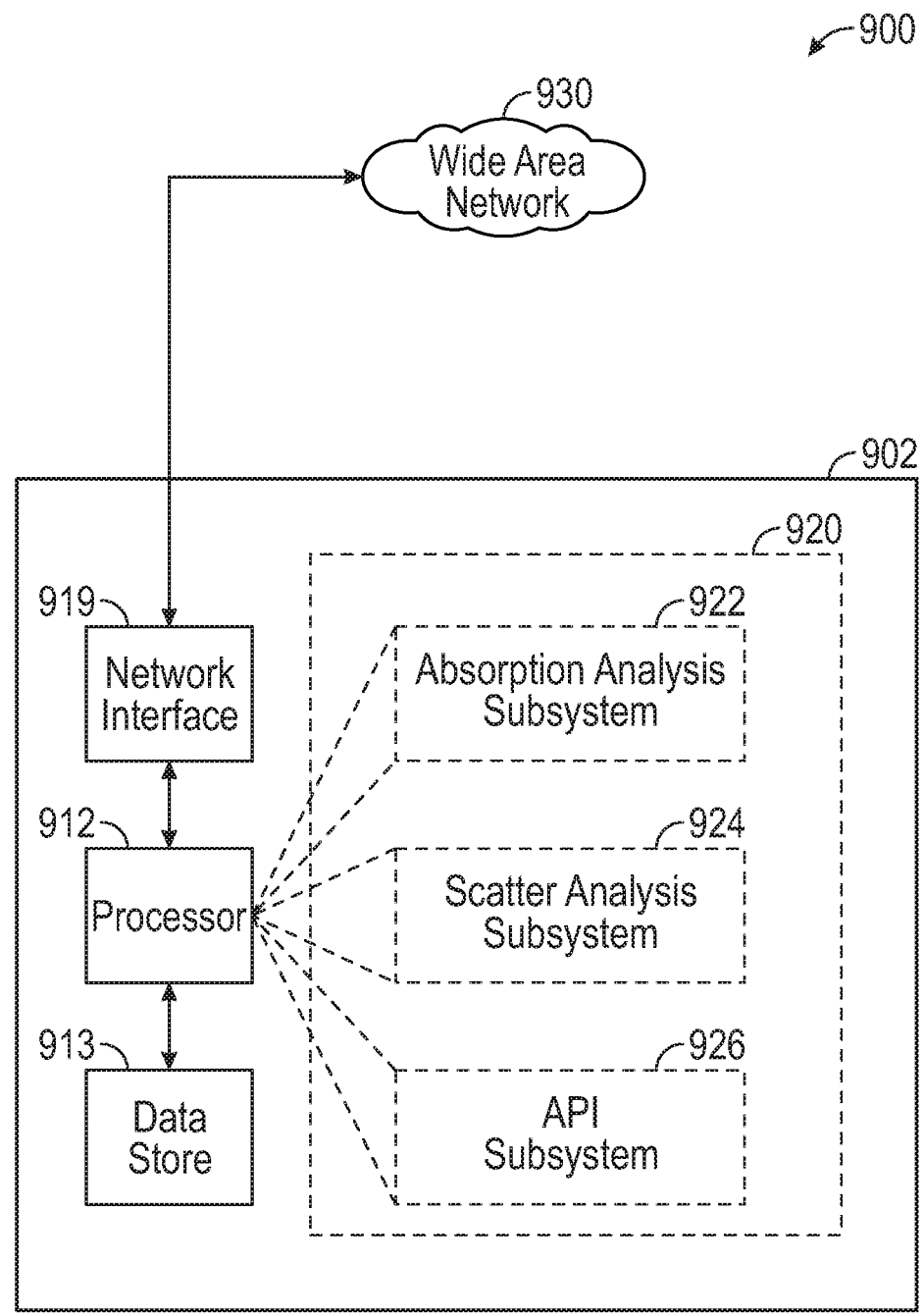
FIG. 7 is a schematic block diagram of a three-dimensional (3-D) imaging system (DCDS), in accordance with embodiments of the disclosure.

FIG. 7 shows a system 900 that includes processing apparatus 902 that interfaces with a wide area network 930. The apparatus 902 includes network interface 919, processor 912 and data store 913. Data store 913 includes subsystem module 920, which includes absorption analysis subsystem 922, scatter analysis subsystem 924 and API subsystem 926.

Those skilled in the art will understand that the principles of the present disclosure may be implemented on or in data communication with any type of suitably arranged device or system configured to perform range analysis operations, in any combination. System 900 of the present design may comprise a processor 912 that may be operable to accept and execute computerized instructions, and also a data store 913 that may store data and instructions used by the processor 912. The processor 912 may be in data communication with external computing resources, such as the wide area network (WAN) 930, through a network interface 919. Furthermore, the processor 912 may be configured to direct input received from components of the WAN 930 to the data store 913 for storage. Similarly, the processor 912 may be configured to retrieve data from the data store 913 to be forwarded as output to various components of the WAN 930.

For example, and without limitation, the computerized instructions of the system 900 may be configured to implement absorption analysis subsystem 922 that may be stored in the data store 913 and retrieved by the processor 912 for execution. The absorption analysis subsystem 922 may be operable to determine range to a target object from differential absorption in the atmosphere as described above. Also, for example, and without limitation, the computerized instructions of the system 900 may be configured to implement a scatter analysis subsystem 924 that may be stored in the data store 913 and retrieved by the processor 912 for execution. The scatter analysis subsystem 924 may be operable to determine range to a target object from scattered signals intensities as described above. Also for example, and without limitation, the computerized instructions of the system 900 may be configured to implement Application Programming Interface (API) 926 that may be stored in the data store 913 and retrieved by the processor 912 for execution. The API subsystem 926 may be operable to forward computed range information for use by downstream applications.

Those skilled in the art will appreciate that the present disclosure contemplates the use of computer instructions and/or systems configurations that may perform any or all of the operations involved in 3-D imaging using LADAR. The disclosure of computer instructions that include absorption analysis subsystem 922 instructions, scatter analysis subsystem 924 instructions, and API subsystem 926 instructions is not meant to be limiting in any way. Those skilled in the art will readily appreciate that stored computer instructions and/or systems configurations may be configured in any way while still accomplishing the many goals, features and advantages according to the present disclosure.

It will be appreciated that the systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (e.g., random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

The invention claimed is:

1. A three-dimensional (3-D) imaging system for determining range to a target comprising:
   a first laser configured to flash illuminate a target with a first wavelength $\lambda_a$ characterized as non-resonant with an absorption line in a laser transmission medium;

a second laser configured to flash illuminate the target with a second wavelength $\lambda_b$ characterized as resonant with the absorption line; and a focal plane array (FPA) configured to receive a first backscatter signal associated with the first wavelength $\lambda_a$;

receive a second backscatter signal associated with the second wavelength $\lambda_b$;

measure a first intensity $S_a$ associated with the first backscatter signal and a second intensity $S_b$ associated with the second backscatter signal; and determine, independent of reflectivity, a range to the target from a ratio of the first intensity $S_a$ and the second intensity $S_b$ where the ratio of the first intensity $S_a$ and the second intensity $S_b$ is defined as $$\frac{Sa}{Sb} = e^{-2R(\alpha(\lambda a) - \alpha(\lambda b))};$$

where $\alpha$ denotes an atmospheric absorption and scattering attenuation factor for the absorption line; and where R denotes the range;

where a respective reflectivity of the first wavelength $\lambda_a$ and of the second wavelength $\lambda_b$ are similar.

2. The 3-D imaging system according to claim 1, where the first wavelength $\lambda_a$ is in a relatively low atmospheric transmission band and the second wavelength $\lambda_b$ is in a relatively high atmospheric transmission band, whereby the second wavelength transmission band is greater than the first wavelength transmission band.

3. The 3-D imaging system according to claim 1, where the first wavelength $\lambda_a$ is in a relatively high atmospheric transmission band and the second wavelength $\lambda_b$ is in a relatively low atmospheric transmission band, whereby the first wavelength transmission band is greater than the second wavelength transmission band.

4. The 3-D imaging system according to claim 1, where the first wavelength $\lambda_a$ and the second wavelength $\lambda_b$ differ by less than 0.015 micrometer (μm).

5. The 3-D imaging system according to claim 1, where the absorption line comprises an atmospheric gas selected from the group consisting of $O_2$, $N_2$, CO, $CO_2$, and $H_2O$.

6. The 3-D imaging system according to claim 1, where the FPA is a low-bandwidth detector.

7. The 3-D imaging system according to claim 1, where the first wavelength $\lambda_a$ and the second wavelength $\lambda_b$ have a pulse duration less than 10 ms.

8. A method of three-dimensional (3-D) imaging for determining range to a target comprising the steps of:

flash illuminating, using a first laser, a target with a first wavelength $\lambda_a$ characterized as non-resonant with an absorption line in a laser transmission medium;

flash illuminating, using a second laser, the target with a second wavelength $\lambda_b$ characterized as resonant with the absorption line;

receiving, using a focal plane array, a first backscatter signal associated with the first wavelength $\lambda_a$ and receiving, using the focal plane array, a second backscatter signal associated with the second wavelength $\lambda_b$, where a respective reflectivity from the target of the first wavelength $\lambda_a$ and of the second wavelength $\lambda_b$ are similar;

measuring, using the focal plane array, a first intensity $S_a$ of the first backscatter signal and a second intensity $S_b$ of the second backscatter signal; and determining, independent of reflectivity and by using the focal plane array, a range to the target from a ratio of the first intensity $S_a$ and the second intensity $S_b$ where the ratio of the first intensity $S_a$ and the second intensity $S_b$ is defined as $$\frac{Sa}{Sb} = e^{-2R(\alpha(\lambda a) - \alpha(\lambda b))};$$

where $\alpha$ denotes an atmospheric absorption and scattering attenuation factor for the absorption line; and where R denotes the range.

9. The method according to claim 8, where the first wavelength $\lambda_a$ is in a relatively low atmospheric transmission band and the second wavelength $\lambda_b$ is in a relatively high atmospheric transmission band, whereby the second wavelength transmission band is greater than the first wavelength transmission band.

10. The method according to claim 8, where the first wavelength $\lambda_a$ is in a relatively high atmospheric transmission band and the second wavelength $\lambda_b$ is in a relatively low atmospheric transmission band, whereby the first wavelength transmission band is greater than the second wavelength transmission band.

11. The method according to claim 8, where the first wavelength $\lambda_a$ and the second wavelength $\lambda_b$ differ by less than 0.015 micrometer (μm).

12. The method according to claim 8, where the absorption line comprises an atmospheric gas selected from the group consisting of $O_2$, $N_2$, CO, $CO_2$, and $H_2O$.

13. The method according to claim 8, where the FPA is a low-bandwidth detector.

14. The method according to claim 8, where the first wavelength $\lambda_a$ and the second wavelength $\lambda_b$ have a pulse duration less than 10 ms.

* * * * *